United States Patent
Trompower (10) Patent No.: US 7,570,929 B1
(45) Date of Patent: Aug. 4, 2009

(54) 802.11 NETWORKS USING DYNAMIC POWER CONTROL FOR RF TRANSMISSION

(75) Inventor: Michael L. Trompower, Navarre, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/483,399

(22) Filed: Jan. 14, 2000

(51) Int. Cl.
*H04B 1/04* (2006.01)
(52) U.S. Cl. ................................... 455/114.3
(58) Field of Classification Search .............. 455/114, 455/91, 522, 127, 575, 64, 114.3, 574, 127.1, 455/127.5, 13.4; 375/297, 296, 295; 370/318, 370/319, 321, 465, 337, 347, 338; 709/229, 709/240
See application file for complete search history.

(56) References Cited

U.S. PATENT DOCUMENTS

| | | | |
|---|---|---|---|
| 5,289,459 A * | 2/1994 | Brownlie ................... 370/17 |
| 5,333,175 A * | 7/1994 | Ariyavisitakul et al. ....... 379/58 |
| 5,450,616 A * | 9/1995 | Rom ......................... 455/69 |
| 5,461,627 A | 10/1995 | Rypinski .................... 370/95.2 |
| 5,553,316 A | 9/1996 | Diepstraten et al. ............ 455/69 |
| 5,572,528 A | 11/1996 | Sheun ....................... 370/85.13 |
| 5,636,140 A * | 6/1997 | Lee et al. .................... 364/514 |
| 5,706,428 A * | 1/1998 | Boer et al. ................... 370/342 |
| 5,708,681 A | 1/1998 | Malkemes et al. ............ 375/297 |
| 5,768,695 A * | 6/1998 | Fischer et al. ................ 455/127 |
| 5,982,807 A * | 11/1999 | Snell ......................... 375/146 |
| 5,987,011 A | 11/1999 | Toh .......................... 370/331 |
| 5,987,033 A | 11/1999 | Boer et al. ................... 370/445 |
| 6,301,231 B1 * | 10/2001 | Hassan et al. ............... 370/316 |
| 6,463,042 B1 * | 10/2002 | Paatelma .................... 370/318 |

\* cited by examiner

*Primary Examiner*—Melody Mehrpour
(74) *Attorney, Agent, or Firm*—Amin, Turocy & Calvin, LLP (57) ABSTRACT

A system and method is provided for adjusting transmission power of different portions of a data packet. The system and method is especially useful when utilizing the IEEE 802.11 standard protocol due to the varying transmission data rates of a packet. A IEEE 802.11 packet includes a preamble portion, a header portion and a data portion. The preamble portion has a data rate of 1 Mbps, the header has a data rate of 1 or 2 Mbps and the data portion has a data rate of 1, 2, 5.5 or 11 Mbps. At a given fixed power level, a transmission at a higher data rate has a lower transmission range than a transmission at a lower data rate. Therefore, the present invention provides for a system and method that adjusts the power level of different portions of a data packet, so that the entire data packet has a more uniform range. This eliminates the need for components in the system receiving a preamble portion of a transmission at higher ranges to remain idle during transmission of an entire frame. The system and method can be applied to both access points and mobile units in a cellular communications system.

31 Claims, 10 Drawing Sheets

802.11 NETWORKS USING DYNAMIC POWER CONTROL FOR RF TRANSMISSION

TECHNICAL FIELD

The present invention generally relates to communication systems, and in particular to a system and method for increasing throughput of a communication system.

BACKGROUND OF THE INVENTION

The use of cellular communication systems having mobile devices which communicate with a hardwired network, such as a local area network (LAN) or a wide area network (WAN), has become widespread. Retail stores and warehouses, for example, may use cellular communications systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Such systems are also utilized for cellular telephone communications to allow users with wireless telephones to roam across large geographical regions while retaining telephonic access. Paging networks also may utilize cellular communications systems which enable a user carrying a pocket sized pager to be paged anywhere within a geographic region.

A typical cellular communications system includes a number of fixed access points (also known as base stations) interconnected by a cable medium often referred to as a system backbone. Also included in many cellular communications systems are intermediate access points which are not directly connected to the system backbone but otherwise perform many of the same functions as the fixed access points. Intermediate access points, often referred to as wireless access points or base stations, increase the area within which access points connected to the system backbone can communicate with mobile devices.

Associated with each access point is a geographic cell. The cell is a geographic area in which an access point has sufficient signal strength to transmit data and receive data from a mobile device such as a data terminal or telephone with an acceptable error rate. Typically, access points will be positioned along the backbones such that the combined cell area coverage from each access point provides full coverage of a building or site.

Mobile devices such as telephones, pagers, personal digital assistants (PDA's), data terminals etc. are designed to be carried throughout the system from cell to cell. Each mobile device is capable of communicating with the system backbone via wireless communication between the mobile device and an access point to which the mobile device is registered. As the mobile device roams from one cell to another, the mobile device will typically deregister with the access point of the previous cell and register with the access point associated with the new cell. In order to provide sufficient cell area coverage, access points (or the antennas associated with each access point) within the cellular communications system typically are distributed at separate physical locations throughout an entire building or set of buildings.

Recently a standard for wireless local area networks (WLANs) known as the IEEE 802.11 standard has been adopted and has gained acceptance among the industrial, scientific and medical communities. The IEEE 802.11 standard for WLANs is a standard for systems that operate in the 2,400-2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems. Current wireless implementations employ a single power level for transmission of an entire packet. As a result, different portions of the packet are capable of reception at different ranges. Therefore, default operation results in a longer preamble range as compared to the other portions of the frame. Once a preamble is correctly received by other access stations, they often need to remain off during an entire frame or frame exchange. This causes stations that are outside an intended transmission range to remain idle during the frame transmission thereby reducing the entire throughput of the system.

An attempt has been made to solve this problem by providing multiple access stations at a single location operating on different frequencies. However, this requires that each station in a single location be different with respect to hardware and software required to operate the station. This has proven to be complicated and expensive in actual implementation. In addition, there is typically only three non-overlapping channels available in such types of systems. Therefore, this solution does not overcome the problem with idle access stations when all three channels are operating. Furthermore, these transmissions along the three channels still do not guarantee access points will not receive interference.

Accordingly, there is a strong need in the art for a system and method that overcomes the aforementioned problems.

SUMMARY OF THE INVENTION

The present invention provides for a system and method for adjusting transmission power level of different portions of a data packet. The system and method is especially useful when utilizing the IEEE 802.11 standard protocol due to the varying transmission data rates of a packet. An IEEE 802.11 packet includes a preamble portion, a header portion and a data portion. The preamble portion typically has a data rate of 1 Mbps (Megabits per second), the header has a data rate of 1 or 2 Mbps and the data portion has a data rate of 1, 2, 5.5 or 11 Mbps. At a given fixed power level, a transmission at a higher data rate has a lower transmission range than a transmission at a lower data rate. Therefore, the present invention provides for a system and method that adjusts the power level of different portions of a data packet, so that the entire data packet has a more uniform range. This eliminates the need for components in the system receiving a preamble portion of a transmission at the higher ranges to remain idle during transmission of an entire frame as is the standard in the IEEE 802.11. Furthermore, the present invention allows for dynamic adjustment of the power transmission level, so that range reductions can be implemented to mitigate interference problems and reduce battery consumption. The system and method can be applied to both access points and mobile units in a cellular communications system.

In accordance with one aspect of the invention, a communication unit in a cellular communication system is provided. The unit includes a transmitter adapted to transmit data over an RF link and a power control module coupled to the transmitter. The power control module is adapted to receive a data packet having a first portion and a second portion and transmit the first portion at a first transmission power level and the second portion at a second transmission power level.

Another aspect of the invention relates to a method of transmitting a data packet in a cellular communication system. The method includes the steps of transmitting a first portion of the data packet at a first transmission power level and transmitting a second portion of the data packet at a second transmission power level.

Another aspect of the present invention relates to an access point system in a cellular communication system utilizing an IEEE 802.11 standard protocol. The system includes a transmitter adapted to transmit data over an RF link and a power control module coupled to the transmitter. The power control module is adapted to receive a data packet having a PLCP preamble and PLCP header portion and a data portion. The power control module is also adapted to dynamically adjust the transmission power of the packet during transmission of the packet, such that the PLCP preamble portion begins transmitting at a first transmission power level and the data portion begins transmitting at a second transmission power level. The system further includes a processor coupled to the power adjustment module. The processor is adapted to provide power adjustment information to the power control module. Finally, the system includes a receiver coupled to the processor. The receiver is adapted to receive data over an RF link. Furthermore, the access point system is coupled to a network.

Yet another aspect of the present invention relates to a cellular communication system. The system includes means for transmitting a data packet having a first portion and a second portion and means for dynamically adjusting the transmission power level, of the first portion with respect to the second portion of the data packet coupled to the means for transmitting a data packet having a first portion and a second portion.

In yet another aspect of the present invention a signal transmitted over a wireless communication system is provided. The signal includes a first portion transmitted at a first power level and a second portion transmitted at a second power level.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will now be described with reference to the drawings. The present invention will be described with reference to a system and method for dynamically adjusting transmission power of different portions of a data packet transmitting at different data rates. It should be understood that the description of these aspects of the invention are merely illustrative and that they should not be taken in a limiting sense.

Figure 1:
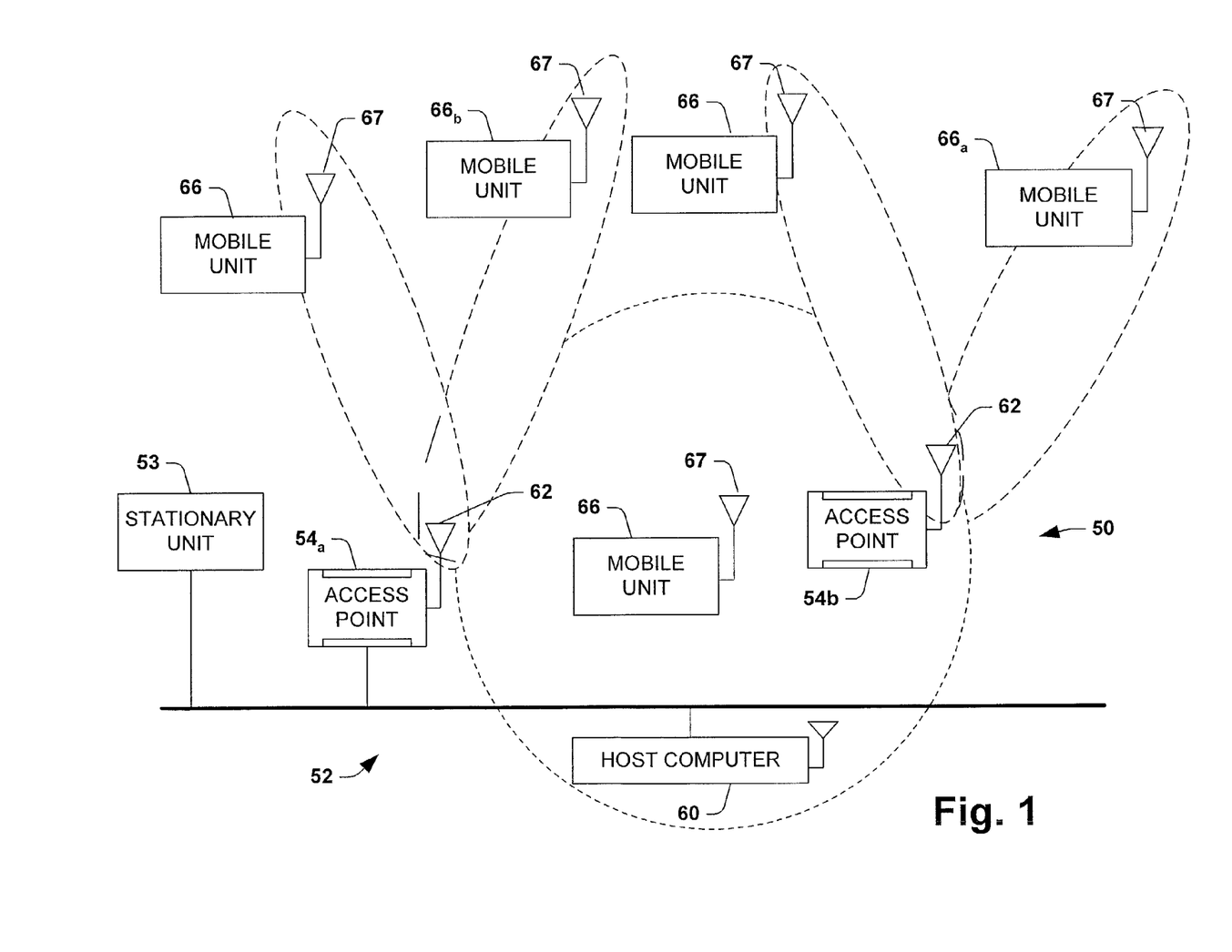
FIG. 1 illustrates a system diagram of a network communication system in accordance with the present invention.

Referring now to FIG. 1, a cellular communication system 50 illustrating an environment of the present invention is shown. The cellular communication system 50 includes a local area network (LAN) 52. The LAN or network backbone 52 may be a hardwired data communication path made of twisted pair cable, shielded coaxial cable or fiber optic cable, for example, or may be wireless or partially wireless in nature. Coupled to the LAN 52 are a stationary communication unit 53 and several access points 54. Only one access point $54_a$ is shown hardwired to the network backbone 52, however, it is understood that more than one hardwired access points $54_a$ may be physically connected to the network backbone 52. The access points 54 may be hardwired to the network 52 such as access point $54_a$ or may be wirelessly coupled to the backbone 52 such as access point $54_b$. Each access point serves as an entrance point through which wireless communications may occur with the network backbone 52. The wireless access point $54_b$ may be employed to expand the effective communication range of the cellular communication system 50. As is conventional, each wireless access point $54_b$ associates itself, typically by registration, with another access point or a host computer 60 coupled to the network backbone 52, whether hardwired or wireless, such that a link is formed between itself and other devices situated on the network backbone 52.

Each access point 54 is capable of wirelessly communicating with other devices in the communication system 50 via respective antennas commonly denoted by reference numeral 62. The antenna 62 for any particular device may be of any type suitable for use in a network cellular communication system, such as an omni-directional antenna, a yagi-type antenna, etc. A geographic cell (not shown) associated with each access point 54 defines a region of coverage in which successful wireless communication may occur. Depending on the type of antenna 62 selected and output power of the respective access point, the geographic cell may take one of several different forms and sizes. For example, the antenna 62 could be an omni-directional antenna if a generally spherical cell area of coverage is desired. A directed yagi-type antenna could be used as the antenna 62 for a more directed elliptical cell area of coverage.

The cellular communication system 50 also includes one or more mobile communication units 66. The mobile communication units 66 each include an antenna 67 for wirelessly communicating with other devices. Each mobile communication unit 66 communicates with devices on the network backbone 52 via a selected access point 54 and/or with other mobile communication units, and/or directly with the host computer 60 if within cell range of the host computer 60. Upon roaming from one cell to another, the mobile communication unit 66 is configured to associate itself with a new access point 54 or directly with the host computer 60 if within range. A mobile communication unit 66 registers with a particular access point which provides the particular mobile communications unit with wireless access to the network backbone 52.

Figure 2:
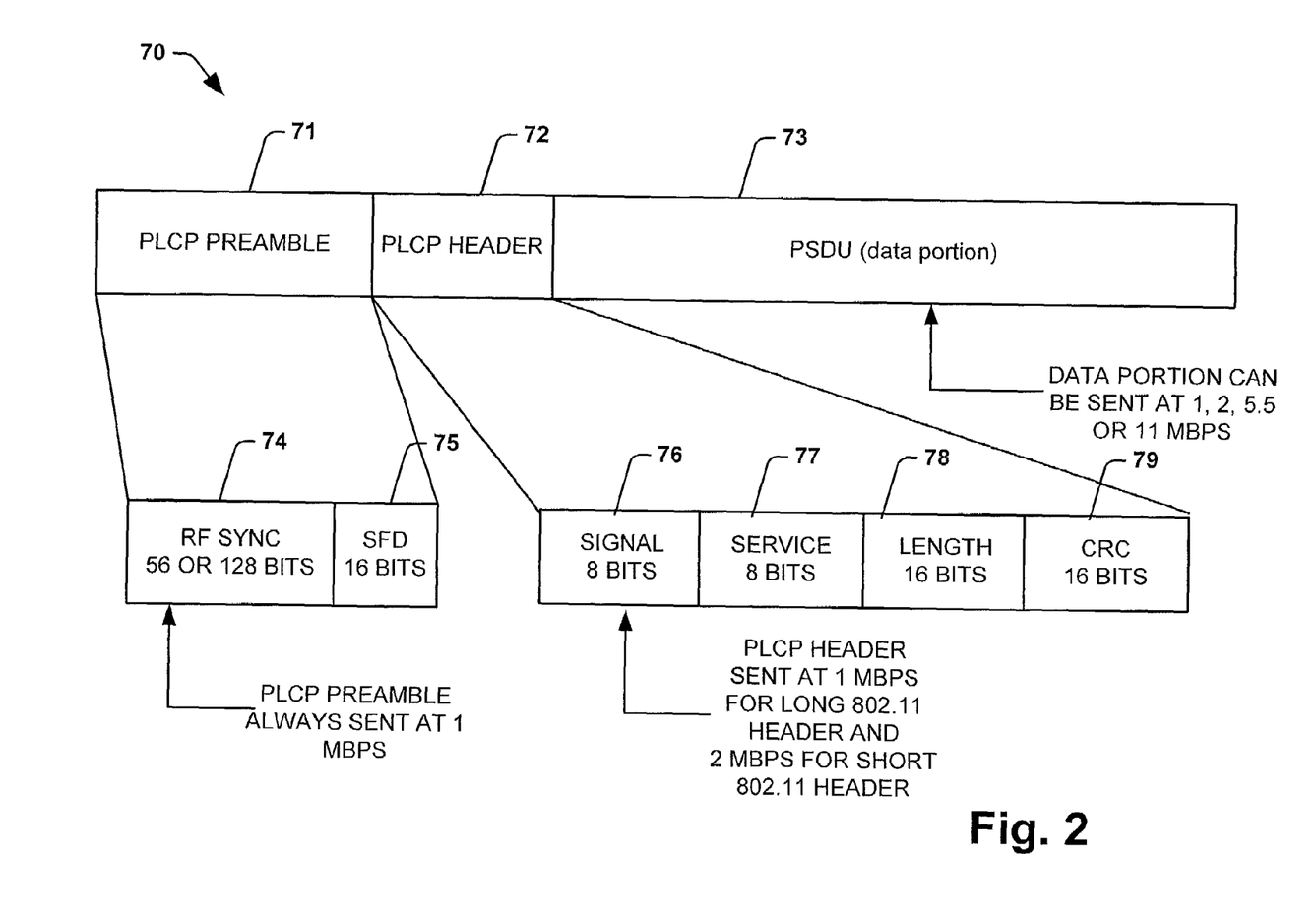
FIG. 2 illustrates a protocol of a IEEE 802.11 standard data packet in accordance with the present invention.

Typically, access points 54 and mobile units 66 in different cells can communicate with each other during the same time period, such that simultaneous communication is occurring in system 50. However, access points 54 and mobile units 66 complying to the IEEE 802.11 protocol have cell ranges that are different with respect to different portions of a packet transmitted from an access point to a mobile unit or another access point. This is due to different portions of a packet being transmitted at different data rates and having different modulations. FIG. 2 illustrates portions of a packet 70 being transmitted at different data rates and thus having different transmission ranges. FIG. 2 is a block diagram depicting a Physical Layer Convergence Procedure (PLCP) frame or packet 70 conforming to the IEEE standard 802.11 "Direct Sequence Spread Spectrum Physical Layer Specification". Alternatively, the present invention may be employed utilizing the IEEE standard 802.11 "Frequency Hopping Spread Spectrum Physical Layer Specification" or any other protocol transmitting portions of packets at varying modulations and data rates. The packet 70, for example, includes a PLCP preamble portion 71, a PLCP header portion 72, and a Protocol Data Unit (PDU) portion 73 (data portion). The PLCP preamble 71 includes a RF SYNC field 74 and an Start Frame Delimiter (SFD) field 75. The sync field 74 is used by the radio to detect a signal to receive, and to reach steady state frequency offset correction and synchronization. The SFD field 75 is used to indicate the end of the PLCP preamble 71 and beginning of the PLCP header 72. The fields 74 and 75 of the PLCP preamble portion 71 are transmitted at a data rate of 1 Mbps. The PLCP header 72 includes a signal field 76, a service field 77, a length field 78 and Cyclical Redundancy Correction (CRC) field 79. The fields 76, 77, 78 and 79 of the PLCP header are transmitted at a data rate of 1 Mbps for a long IEEE 802.11 header and at 2 Mbps for a short IEEE 802.11 header. The PDU portion 73 of the packet 70 can be transmitted at 1, 2, 5.5 or 11 Mbps.

Figure 3:
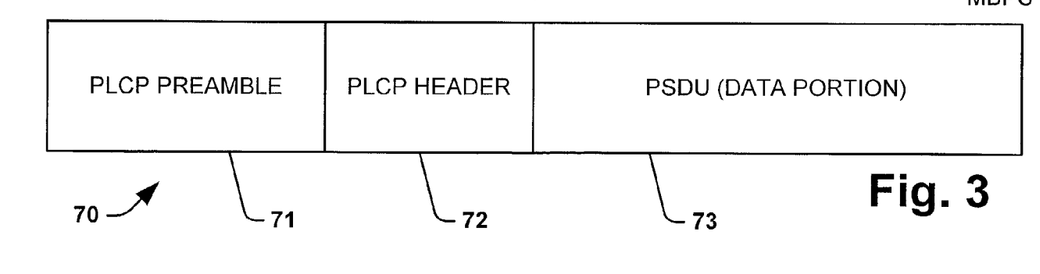
FIG. 3 illustrates a graph of a range of a transmission for different portions of the data packet of FIG. 2 at a given power level in accordance with the present invention.

FIG. 3 illustrates a graph 80 corresponding to a transmission of the packet 70 with respect to range verses the data rate of the packet transmission at a constant power of 100 milliwatts. The PLCP header 71 transmitting at 1 Mbps at 100 milliwatts can, for example, have a range of about 2000 feet depending on antenna range, receiver sensitivity, antenna gain, cable loss etc. The PLCP 72 header 72 of the same packet transmitting at 2 Mbps at 100 milliwatts can have a range between 125 feet and 2000 feet. The data portion 73 of the same packet transmitting at 11 Mbps at 100 milliwatts can have a range of 125 feet. Any access point receiving a valid PLCP preamble may remain idle until the entire transmission is complete because the access point will assume that the device transmitting the PLCP preamble is transmitting within their cell. However, the access point may not receive the actual data because the range of the data is much less than the range of the preamble. If an access point transmits the data portion 73 at 11 Mbps, all other access points within 2000 feet of the access point will remain idle during the full transmission, while only access points within 125 feet of the transmitting access point will be able to receive data. In some indoor systems, all access points are within 2000 feet from one another and thus all but one access point will remain idle while the one access point is transmitting.

Figure 4A:
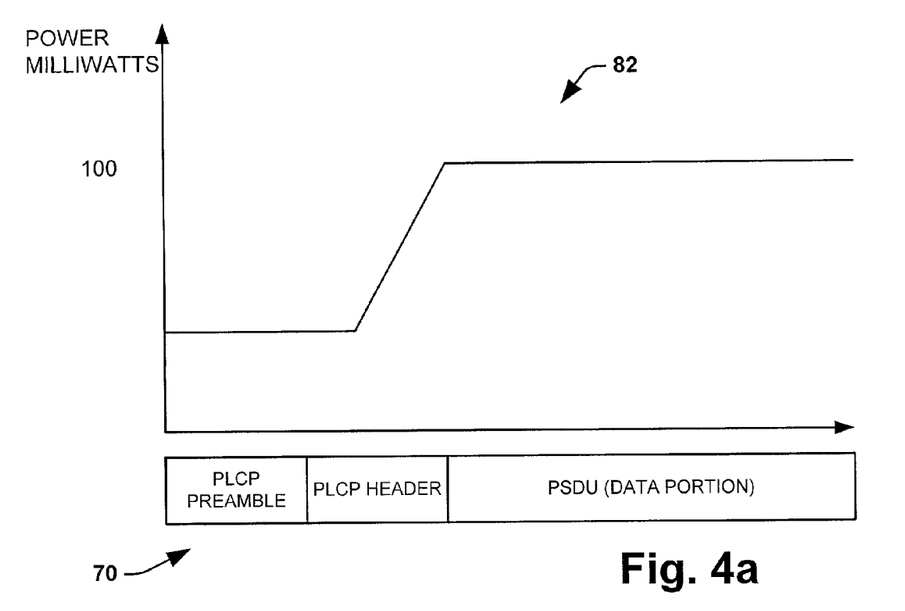
FIG. 4a illustrates a graph of a power of a transmission for different portions of the data packet of FIG. 2 at a reduced power level for the PLCP preamble in accordance with the present invention.
Figure 4B:
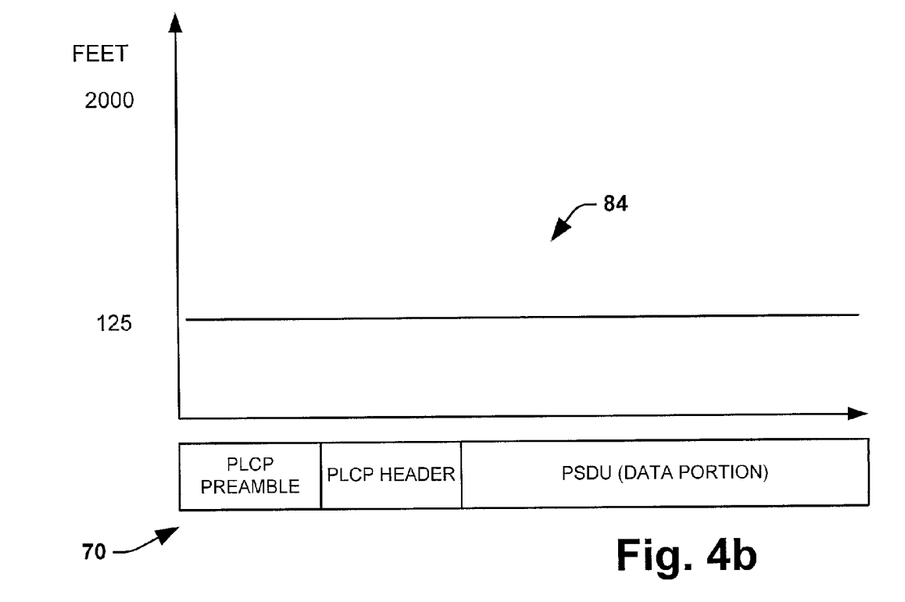
FIG. 4b illustrates a graph of a range of a transmission with respect to the power graph of FIG. 4a in accordance with the present invention.

FIGS. 4a-4d are graphs illustrating the transmitting power and range versus the time during transmission of a packet in accordance with the present invention. The graphs illustrate that by adjusting power during a packet transmission a more uniform range can be achieved. FIG. 4a includes a graph 82 illustrating adjustment of transmission of a packet where the data portion of the packet is transmitted at a power of 100 milliwatts and the transmission power of the preamble and header portion of the packet is lowered, so that the transmission range of the entire packet is uniform. As can be seen from graph 82, the power is increased during the transmission of the PLCP header. Although this causes the transmission of the PLCP header to increase outside the desired range during the power adjustment, access points outside the desired range will not receive a valid PLCP preamble, and therefore will ignore the portions of the header received as being interference or noise. This allows adjustment of power to be gradual as opposed to instantaneous. FIG. 4b includes a graph 84 illustrating a uniform range of 125 feet corresponding to the power transmission graph of FIG. 4a.

Figure 4C:
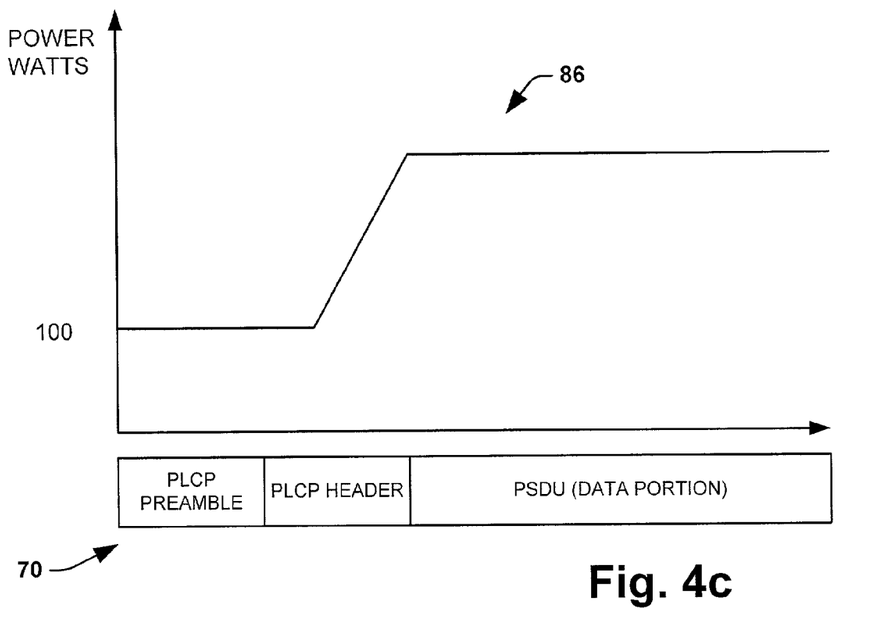
FIG. 4c illustrates a graph of a power of a transmission for different portions of the data packet of FIG. 2 at an increased power level for the PLCP data portion in accordance with the present invention.
Figure 4D:
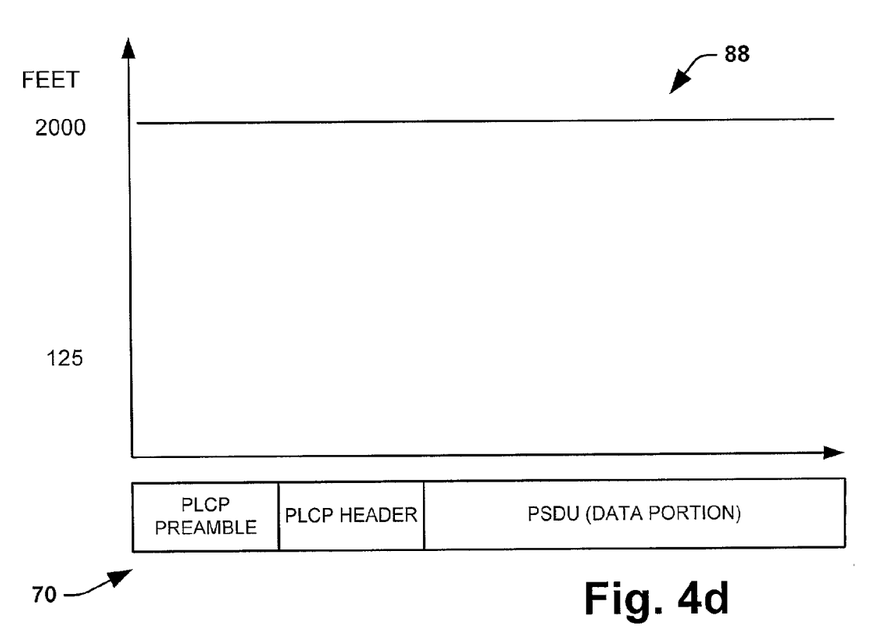
FIG. 4d illustrates a graph of a range of a transmission with respect to the power graph of FIG. 4c in accordance with the present invention.

FIG. 4c includes a graph 86 illustrating an adjustment of power of transmission of a packet where the preamble and header are transmitted at 100 milliwatts and the transmission power of the data portion is increased, so that transmission range of the entire packet is more uniform. FIG. 4d includes a graph 88 illustrating a uniform range of 2000 feet corresponding to the power transmission graph of FIG. 4c.

It is to be appreciated that a uniform range can be achieved by decreasing transmission power during transmitting of the PLCP preamble with respect to transmitting power of the data portion, or increasing transmission power during the transmitting of the data portion of the packet with respect to transmission power of the PLCP preamble. It is to be further appreciated that numerous variations of transmit power can be selected for the PLCP preamble, the PLCP header and the data portion for many given ranges and data rates. Although the graphs 84 and 88 illustrate power adjustment for two data rates, it is to be appreciated that the same principle could be applied to a packet transmitting at three data rates or more. As long as a full valid PLCP preamble is not received by an access point, the remaining portion of the packet will be disregarded as noise allowing the access point system to communicate to other devices during transmission of the packet.

Figure 5A:
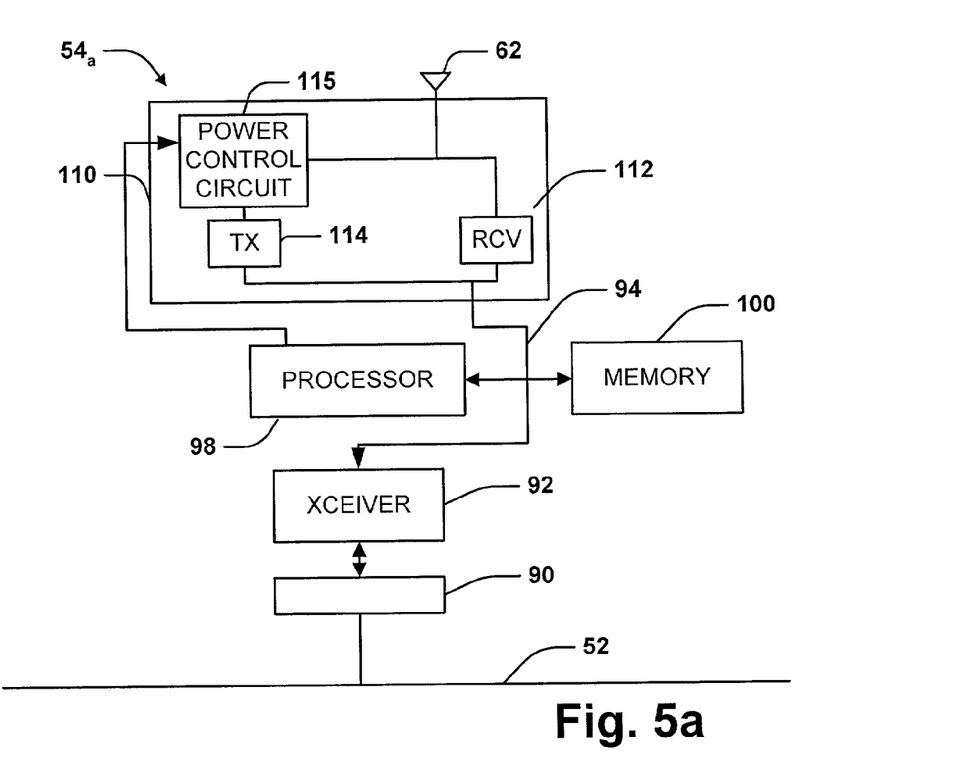
FIG. 5a illustrates a block diagram of a hard wired access point system in accordance with the present invention.

FIG. 5a is a block diagram representative of each hardwired access point 54$_a$. Each hardwired access point 54$_a$ is connected to the network backbone 52 via a connector 90 such as DB-9 or RJ-45 connector. The connector 90 is connected to the network backbone 52 at one end and to a network adapter transceiver 92 included in the access point 54$_a$ at the other end. The network adapter transceiver 92 is configured according to conventional adapter transceiver techniques to allow the access point 54$_a$ to communicate over the network backbone 52. The network adapter transceiver 92 is also connected to an internal bus 94 included within the access point 54$_a$. The access point 54$_a$ further includes a processor 98 connected to the bus 94 for controlling and carrying out the operations of the access point 54$_a$. The processor 98 may include any of a variety of different microprocessors, such as the Motorola 68360 or Intel 80486 microprocessors. It is understood that any suitable processor capable of carrying out the herein described functions of the access points 54$_a$ may be used and falls within the scope of this invention.

The access point 54$_a$ also includes a memory 100 connected to the bus 94. The memory 100 stores program code executed by the processor 98 for controlling the other elements within the access point 54$_a$ to carry out the functions described herein. It will be readily apparent to a person having ordinary skill in the art of microprocessor programming how to program the processor 98 to carry out the operations described herein using conventional programming techniques based on the flowcharts and descriptions provided herein. Accordingly, additional detail as to the specific program code has been omitted. The memory 100 also serves to buffer packets of information such as those received over the network backbone 52 or those transmitted to or received from the mobile communication units 66 or wireless access points 54$_b$. Furthermore, the memory 100 may store tables relating to which of the mobile communication units 66 are registered to the network backbone 52 and/or the identification codes of the mobile communication units 66.

Also connected to the bus 94 is a radio frequency (RF) section 110 included in the access point 54$_a$. The RF section 110 includes the aforementioned antenna 62 for receiving radio signals from the transmitting radio signals to mobile communication units 66 and wireless access points 54$_b$ (FIG. 5b) within the cell area of the access point 54$_a$. Information transmitted from a mobile communication unit 66 or wireless access point 54$_b$ is received via the antenna 62 and is processed by an RF receiver 112 which is connected to the bus 94 and demodulates and decodes the signal and converts the signal to a digital signal having a specific packet format. The processor 98 controls an RF transmitter 114 included in the RF section 110, the RF transmitter also being connected to the bus 94. The processor 98 causes the RF transmitter 114 to modulate and transmit an RF signal which in turn carries the information packet to the appropriate mobile communication unit 66 or wireless access point 54$_b$. A power control circuit 115 is disposed between the antenna 62 and the RF transmitter 114. The power control circuit 115 controls the transmission power of different portions of a data packet transmitted by transmitter 114. The processor receives range information from the mobile communication unit via the receiver 112. The processor then calculates the necessary transmission power values needed for transmission of different portion of a packet. The power values are loaded to the power circuit 115, which dynamically adjusts the transmission power according to the downloaded power values during the transmission of a packet.

Figure 5B:
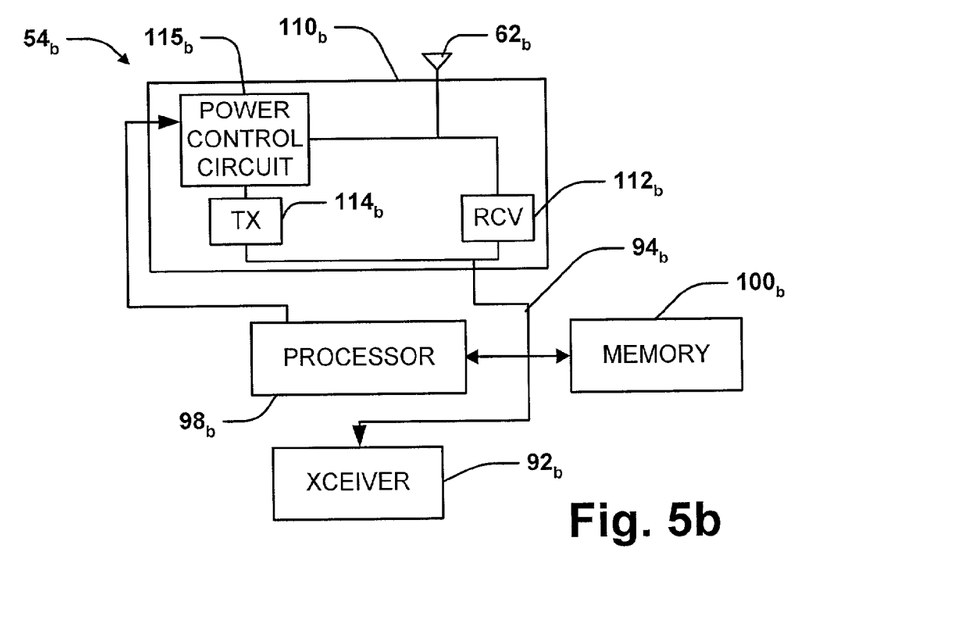
FIG. 5b illustrates a block diagram of a wireless access point system in accordance with the present invention.

FIG. 5b is a block diagram representative of each wireless access point 54$_b$ in the system 50. For the most part, the construction and operation of the components within the wireless access point 54$_b$ are identical to those described with respect to the access points 54$_a$. Hence, similar components are denoted simply by the addition of a. For example, the processor 98 in access point 54$_a$ is similar to the processor 98$_b$ in the wireless access point 54$_b$. However, the wireless access point 54$_b$ is not connected directly to the network backbone 52 and therefore does not include a network transceiver 92 or connector 90 as in each access point 54$_a$. Rather, the wireless access point 54$_b$ communicates with mobile communication units 66 registered thereto and with the particular access point with which the wireless access point 54$_b$ is associated with via the RF section 110$_b$. Operations of the two access points 54$_a$ and 54$_b$ are primarily the same with the exception of the particular procedures described herein. As mentioned above, the wireless access points 54$_b$ function to extend the relative cell coverage of a given access point 54$_a$, and serve primarily to relay information between the access points 54$_a$ and connected to the network backbone 52 and mobile communication units 66. The access point 54 also includes a power control circuit for dynamically adjusting the transmission power of a packet based on the desired range of the transmission.

Figure 6:
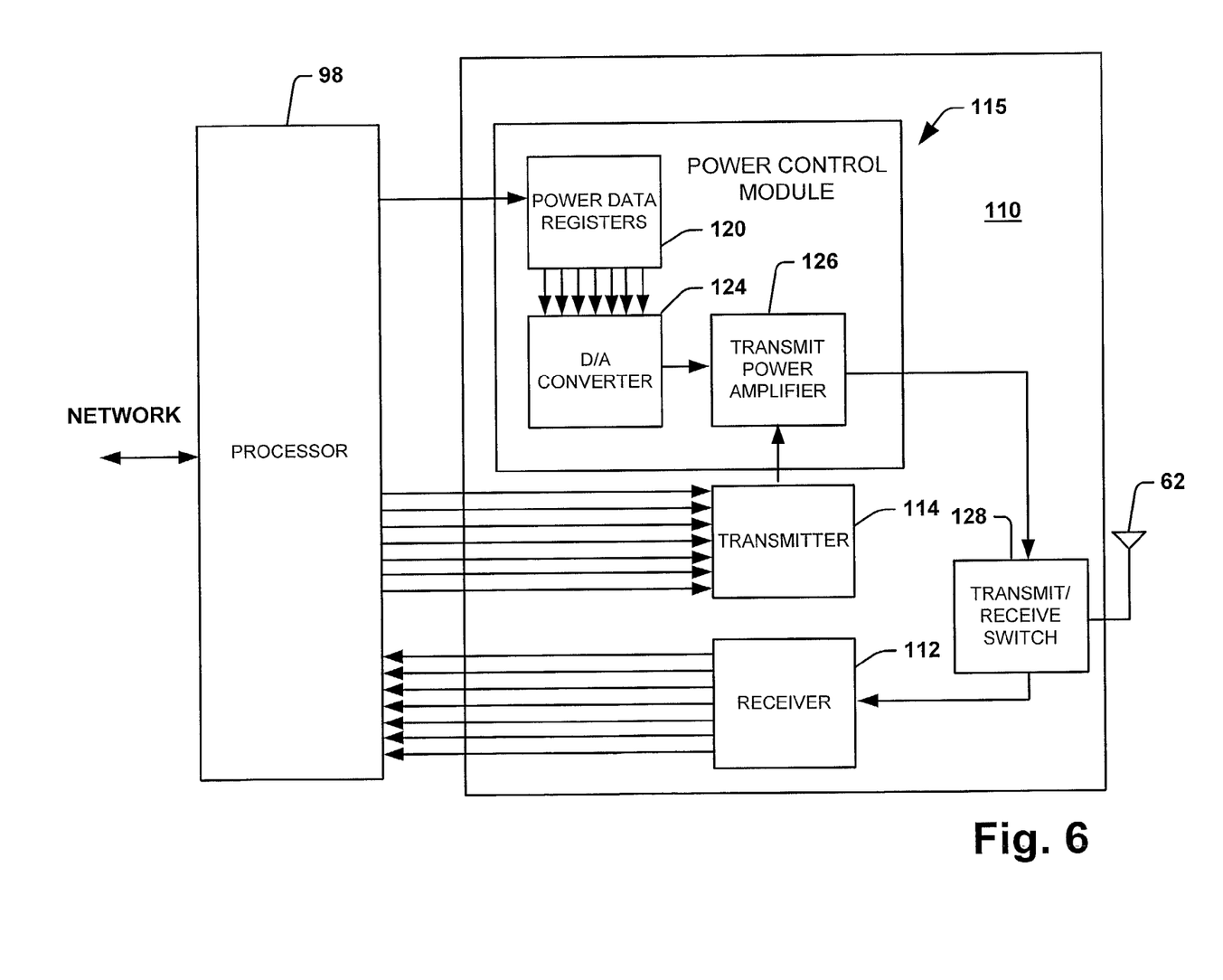
FIG. 6 illustrates a detailed block schematic diagram of the RF section of the access point system of FIG. 5a in accordance with the present invention.

FIG. 6 is a more detailed illustration of one particular embodiment of the processor 98 and RF section 110 arrangement where like components are denoted by like reference numerals. The power control circuit includes a power data register section 120, a D/A converter section 124 and a transmit power amplifier section 126. The transmit power amplifier section 126 transmits the packet data information to a transmit/receive switch 128 coupled to the antenna 62. The transmit/receive switch 128 switches from receiving data through antenna 62 and transmitting data through antenna 62. The power control circuit 115 can be packaged in a single integrated circuit, such as an ASIC. Furthermore, the processor 98, the power control circuit 115, the transmitter 114 and the receiver 112 could be packaged as an ASIC. The transmit power amplifier section 126 receives packet data information from the transmitter 114.

The operation will be described with respect to the operation of the processor 98 and the power control circuit 115 when receiving a registration request from the mobile communication unit 66. The mobile communication unit 66 will transmit a registration request which is received by the antenna 62 and transmitted through the transmit/receive switch 126 to the receiver 112. The receiver 112 receives the data transmission and converts the data to digital data understandable by the processor 98. The data can include information relating transmission power and/or transmission range of the mobile communication unit 66 or the receiver 112 could include the necessary circuitry for calculating the transmission power of the data received. The processor 98 receives this information and determines the necessary power adjustments for transmitting a data packet with portions having variable data rates. The processor 98 then transmits the power adjustment information to the power data register section 120. The power data register section 120 can include a preamble register, a header register and a data register for storing different power information for each portion of a packet. It is to be appreciated that any number of registers can be used if the data protocol is different than the IEEE 802.11 protocol, but still transmits packets or portions of packets at different data rates.

The power data register 120 will transfer data words corresponding to the different transmit power levels one at a time. The D/A converter 124 converts the digital information to an analog control signal coupled to the transmit power amplifier 126 for dynamic adjustment of the transmission power. The processor 98 also creates the data packet according to the appropriate data protocol based on information stored in the memory 100 and/or based on information received over the network 52. The processor 98 transmits the data protocol to the transmitter 114 in digital form. The transmitter converts the data digital data to an analog modulated signal for transmission over the antenna 62. The modulated signal is then transmitted to the power amplifier 126 for adjustment of the transmission power level before transmission over the RF link.

Figure 7:
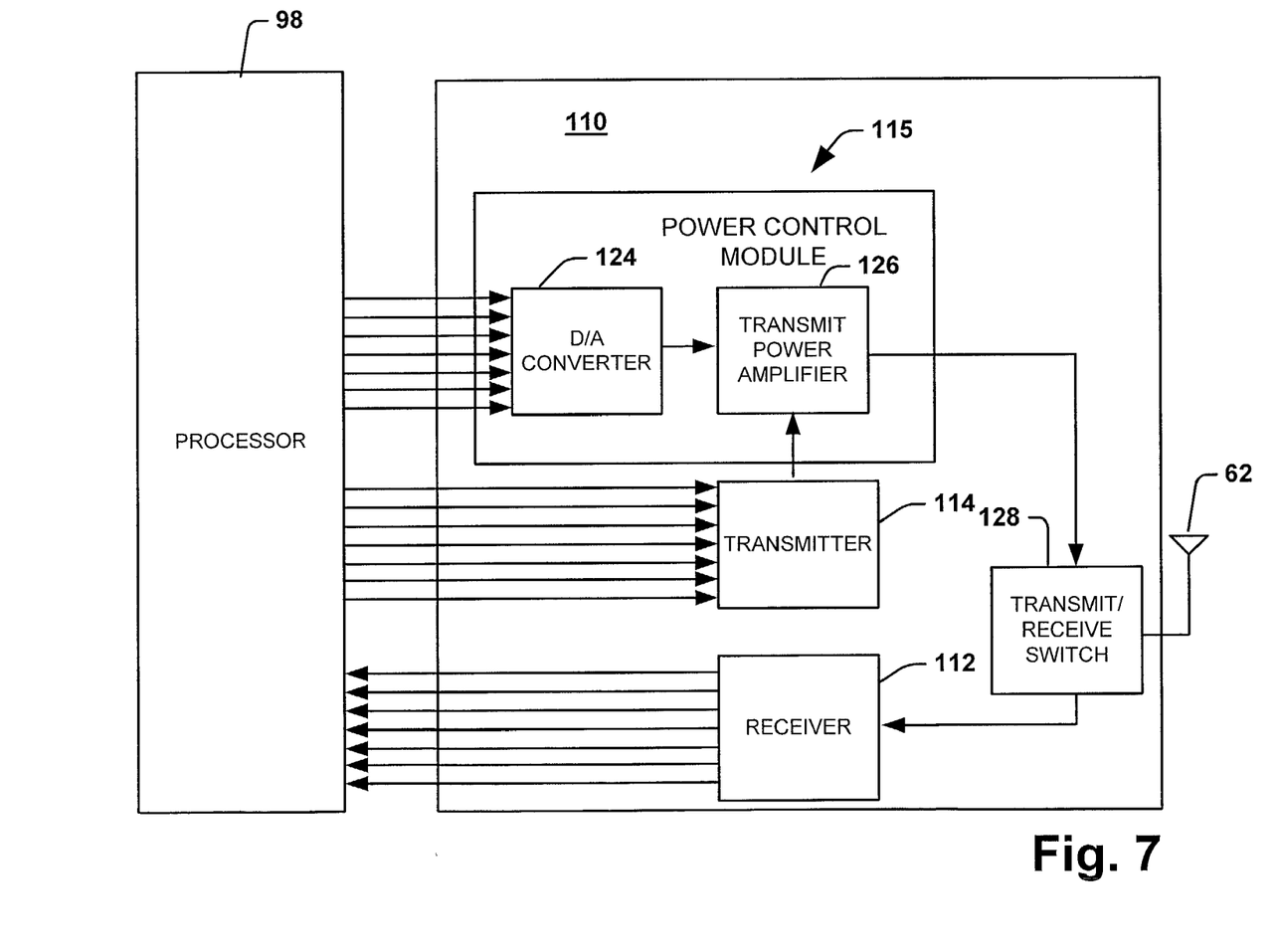
FIG. 7 illustrates a detailed block schematic diagram of an alternate embodiment of the RF section of the access point system of FIG. 5a in accordance with the present invention.

FIG. 7 illustrates an alternate embodiment of the processor 98 and RF section 110 arrangement were like components are denoted by like reference numerals. In the embodiment illustrated in FIG. 7, the power control circuit 115 includes the D/A converter section 124 and the power transmitter power amplifier section 126, but not the power data register section 120. The function of the power data register is performed by software of the processor 98. Utilizing software allows for calculation of the timing necessary to download power data words where the number of packet portions and the data rates for these packet portion may vary from transmission to transmission. The power control data is directly downloaded from the processor 98 to the D/A converter section 124. It is to be appreciated that in some circumstances the power control data can be a constant value, such that the access point system is tuned for a particular range defining a cell area. In this configuration, the D/A converter section 124 can be replaced with an analog circuit configuration independent of the processor 98. It is to be further appreciated that the above described power range control can be implemented into the transmission circuitry of the mobile communication unit 66 such that the mobile communications unit 66 has an adjustable or predefined transmission range. Furthermore, both the access points 54 and the mobile communications units 66 throughout the system can have predefined power adjustment settings for defining predefined system ranges with varying data rates in a packet transmission, such as the IEEE 802.11 standard.

In some situations it is desirable to adjust the transmission range of an access point system 54 and a mobile communication unit 66 during a communication session to reduce the amount of interference received by either or both the access point system 54 and the mobile communication unit 66. In other situations it is desirable to reduce the transmission power, and ultimately the transmission range of an access point system 54 and a mobile communication unit 66 during a communications session to conserve the battery power of one or both the access point system 54 and mobile communication unit 66. The present invention allows for both dynamic adjustment of the power transmission range for either or both the access point system 54 and the mobile communication unit 66 in addition to dynamic adjustment of the power transmission range for a given data packet.

Figure 8:
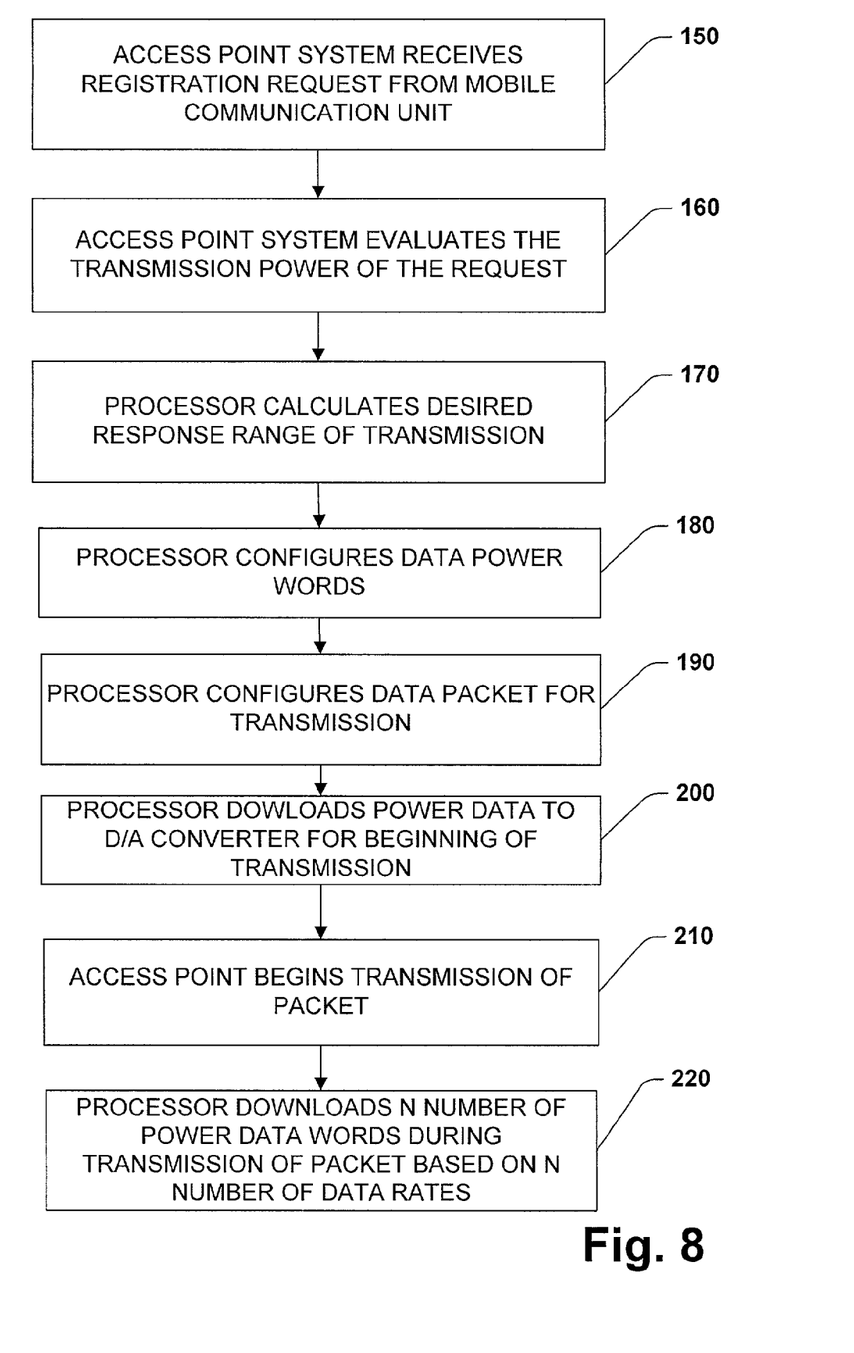
FIG. 8 is a flow diagram illustrating one particular methodology for configuring the power control module in accordance with the present invention.

FIG. 8 is a flow diagram illustrating one particular methodology for performing a dynamic power transmission adjustment when the power transmission range is evaluated based on the transmission range of a registration request to one of the access points 54 from one of the mobile communications units 66 according to the present invention. In step 150, the access point system 54 receives a registration request from a mobile communication unit 66. In step 160, the access point system evaluates the transmission power of the request. In step 170, the processor 98 calculates the desired transmission response range based on the number of packet portions and varying data rates for these portions. In step 180, the processor 98 configures the data power words depending on the number of packet portions with different data rates. The processor 98 then configures the data packet for transmission based on the appropriate protocol or relays information received from the network 52 in step 190. In step 200, the processor 98 downloads power data to the D/A converter 124 based on the desired response range and the data rate of the beginning of the data packet. The access point 54 then begins transmission of the packet in step 210. In step 220, the processor downloads N number of power data words during transmission of the packet based on N number of data rates.

Figure 9:
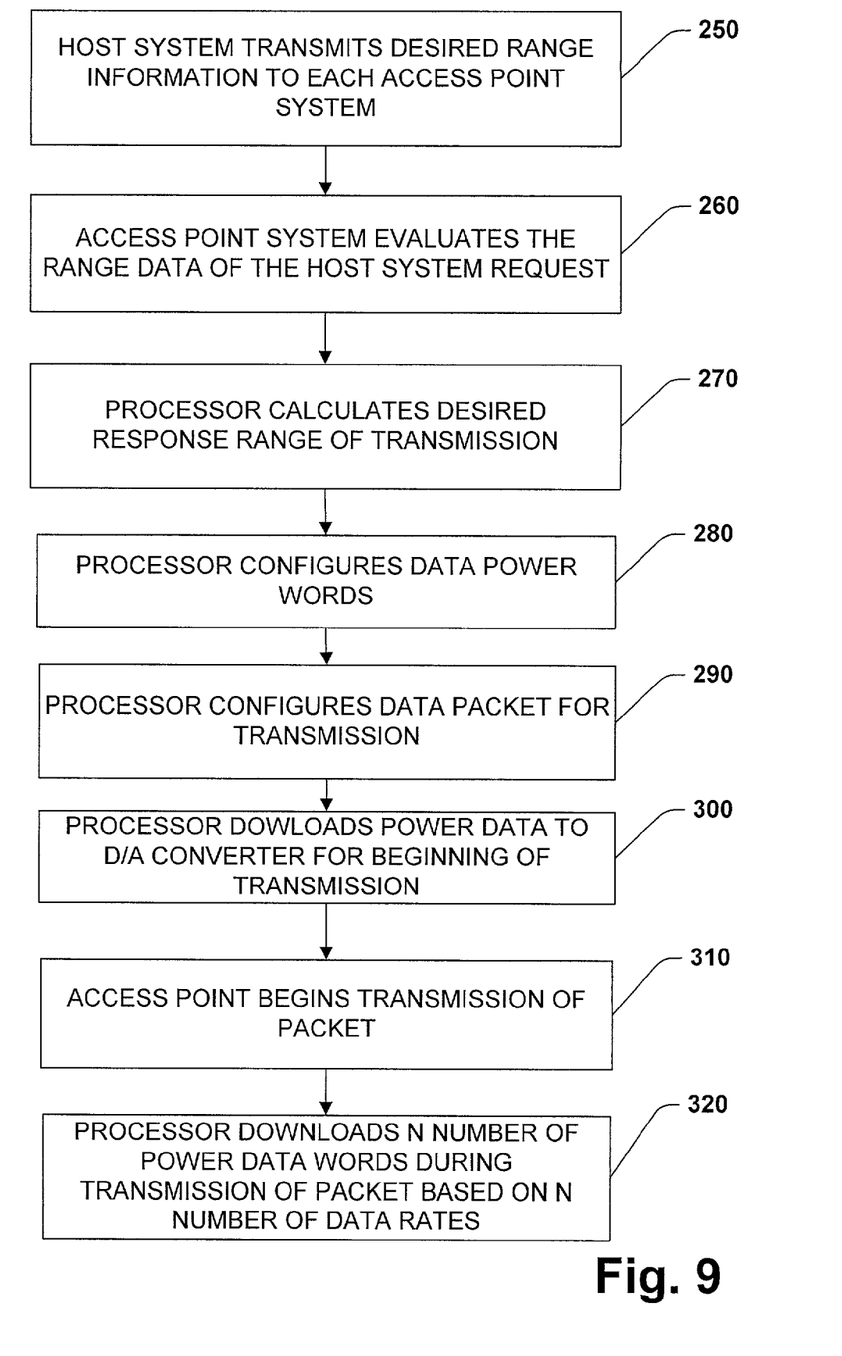
FIG. 9 is a flow diagram illustrating an alternate methodology for configuring the power control module in accordance with the present invention.

FIG. 9 is a flow diagram illustrating one particular methodology for performing a dynamic power transmission adjustment when the desired data rates and ranges are transmitted over the network to each access points 54 from the host computer 60 according to the present invention. In step 250, the host computer 60 transmits desired range information to each access point system 54. In step 260, the access point system evaluates the range request. In step 270, the processor 98 calculates the desired transmission response range based on the number of packet portions and varying data rates for these portions. In step 280, the processor 98 configures the data power words depending on the number of packet portions with different data rates. The processor 98 then configures the data packet for transmission based on the appropriate protocol or relays information received from the network 52 in step 290. In step 300, the processor 98 downloads power data to the D/A converter 124 based on the desired response range and the data rate of the beginning of the data packet. The access point 54 then begins transmission of the packet in step 310. In step 320, the processor 98 downloads N number of power data words during transmission of the packet based on N number of data rates.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A communication unit in a cellular communication system, the unit comprising:
    a transmitter that transmits a data packet over an RF link, the data packet includes a first portion that is transmitted at a first data rate and a second portion that is transmitted at a second data rate that is not equal to the first data rate; and
    a power control module that receives the data packet and that determines a first transmission power for the first portion and a second transmission power for the second portion such that the first portion and the second portion when transmitted at disparate data rates will achieve a uniform transmission range.

2. The unit of claim 1, the data packet includes a third portion and the power control module determines a third transmission power for the third portion based upon the uniform transmission range.

3. The unit of claim 2, the communication unit transmits the first portion of the data packet at a first data rate, the second portion of the data packet at a second data rate and the third portion of the data packet at a third data rate.

4. The unit of claim 3, the data packet conforms to the IEEE 802.11 standard protocol and the first portion of the data packet is a PLCP preamble, the second portion of the data packet is a PLCP header and the third portion of the data packet is a data portion.

5. The unit of claim 1, the communication unit is an access point system.

6. The unit of claim 1, the communication unit is a mobile communication unit.

7. The unit of claim 1, the power control module includes a transmission power amplifier adapted to receive the data packet and dynamically control the transmission power of the first portion and the second portion.

8. The unit of claim 7, the power control module includes a D/A converter that receives power data information in digital format and that converts the power data information to an analog control signal, the analog signal controls the transmission power of the transmission power amplifier.

9. The unit of claim 8, further including a processor coupled to the D/A converter, the processor transmits the power data information to the D/A converter.

10. The unit of claim 9, further including a receiver coupled to the processor, the receiver receives a transmission from another communication unit.

11. The unit of claim 10, the receiver provides transmission power information to the processor from a transmission communication unit transmitting information to the receiver, the processor evaluates a range from the transmission power information and downloads power data information to the power control circuit based on the uniform transmission range of the data packet.

12. The unit of claim 8, the power control module includes a power data register section coupled to the D/A converter, the power data register module stores the power data information and provides the power data information to the D/A converter.

13. The unit of claim 12, further including a processor coupled to the power data register section, the processor transmits the power data information to the power data register section.

14. The unit of claim 13, further including a receiver coupled to the processor, the receiver receives a transmission from other communication units.

15. The unit of claim 14, the receiver provides transmission power information to the processor from a transmission communication unit transmitting information to the receiver, the processor evaluates a range from the transmission power information and downloads power data information to the power control circuit based on the uniform transmission range of the data packet.

16. The unit of claim 1, the communication unit is coupled to a network and the network provides the power control circuit with information relating to the power transmission level of the first portion and the second portion.

17. A method of transmitting a data packet in a cellular communication system, comprising:
transmitting a first portion of the data packet at a first transmission power level;
transmitting a second portion of the data packet at a second transmission power level; and
transmitting a third portion of the data packet at a third transmission power level.

18. The method of claim 17, the first portion of the data packet is transmitted at a first data rate and the second portion of the data packet is transmitted at a second data rate.

19. The method of claim 17, the first power level and the second power level are adjusted so that the first portion and the second portion have essentially the same transmission range.

20. The method of claim 17, further comprising providing a communication unit prior to transmitting a first portion of the data packet at a first transmission power level, the communication unit including a transmitter, a power control module coupled to the transmitter, a processor coupled to the power control module and a receiver coupled to the processor.

21. The method of claim 20, the processor provides the power control module with the first transmission power and the second transmission power after providing a communication unit and prior to transmitting a first portion of the data packet at a first transmission power level.

22. The method of claim 21, the processor evaluates the first transmission power and the second transmission power based on a desired transmission range for the first portion and the second portion of the data packet.

23. The method of claim 22, the processor evaluates the first transmission power and the second transmission power based on a desired transmission range for the first portion and the second portion of the data packet based on a transmission power level of a transmission received from another mobile communication unit.

24. The method of claim 22, the communication unit is coupled to a network and the processor evaluates the first transmission power and the second transmission power based on a desired transmission range for the first portion and the second portion of the data packet, the network providing the processor information relating to the desired transmission range.

25. The method of claim 17, the power level of the first portion and the second portion is dynamically adjusted during the transmission of the data packet.

26. An access point system in a cellular communication system utilizing an IEEE 802.11 standard protocol, comprising:
a transmitter that transmits data over an RF link;
a power control module coupled to the transmitter, the power control module receives a data packet having a PLCP preamble and PLCP header portion and a data portion and dynamically adjusts the transmission power of the packet during transmission of the packet, such that the PLCP preamble portion begins transmitting at a first transmission power level and the data portion begins transmitting at a second transmission power level, the dynamic adjustment of transmission power made to facilitate transmitting the PLCP preamble and the data portion over a substantially similar transmission range;
a processor coupled to the power adjustment module, the processor provides power adjustment information to the power control module; and
a receiver coupled to the processor, the receiver receives data over an RF link, the access point system is coupled to a network.

27. The system of claim 26, the power control module includes a transmission power amplifier that receives the data packet and control the transmission power of the PLCP preamble portion and the data portion, the transmission power amplifier coupled to a D/A converter, the D/A converter receives power data information in digital format and converts the power data information to an analog control signal, the analog control signal controls the transmission power of the transmission power amplifier.

28. The system of claim 27, the power control module includes a power data register module coupled to the D/A converter, the power data register stores the power data information and provides the power data information to the D/A converter, the processor is coupled to the D/A converter, the processor transmits the power data information to the D/A converter.

29. A cellular communication system, comprising:
means for transmitting a data packet having a first portion and a second portion;
means for dynamically adjusting a transmission power level of the first portion with respect to the second portion of the data packet coupled to the means for transmitting a data packet having a first portion and a second portion; and means for determining the transmission power level of the first and second portion, whereby each portion is to be transmitted at a disparate data rate, the transmission power level is determined in order to match a desired transmission range.

30. The system of claim 29, the means for dynamically adjusting the transmission power level of the first portion with respect to the second portion of the data packet further provides for adjusting the power transmission level of a third portion of the data packet with respect to the first and second portions, in order to match the desired transmission range.

31. A signal transmitted over a wireless communication system, the signal comprising:
 a data packet having a first portion transmitted at a first power level, a second portion transmitted at a second power level, and a third portion transmitted at a third power level.

\* \* \* \* \*

UNITED STATES PATENT AND TRADEMARK OFFICE
CERTIFICATE OF CORRECTION

PATENT NO. : 7,570,929 B1                                   Page 1 of 1
APPLICATION NO. : 09/483399
DATED : August 4, 2009
INVENTOR(S) : Trompower

It is certified that error appears in the above-identified patent and that said Letters Patent is hereby corrected as shown below:

ON THE TITLE PAGE

On the Face Page, in the Figure, delete "  " and insert --  --, therefor.

DRAWINGS

In Fig. 1, Sheet 1 of 10, delete "  " and insert --  --, therefor.

In Fig. 5a, Sheet 6 of 10, delete "  " and insert

-- [CONNECTOR]—— 90 --, therefor.

In Fig. 8, Sheet 9 of 10, for Tag "200", delete "DOWLOADS" and insert -- DOWNLOADS --, therefor.

In Fig. 9, Sheet 10 of 10, for Tag "300", delete "DOWLOADS" and insert -- DOWNLOADS --, therefor.

In Column 8, Line 11, delete "54" and insert -- 54b --, therefor.

Signed and Sealed this

Twenty-third Day of February, 2010

David J. Kappos
*Director of the United States Patent and Trademark Office*